United States Patent
Mondal

(10) Patent No.: US 11,118,506 B2
(45) Date of Patent: Sep. 14, 2021

(54) GEAR ASSEMBLY FOR A TURBO MACHINE

(71) Applicant: General Electric Company, Schenectady, NY (US)

(72) Inventor: Bhaskar Nanda Mondal, Bangalore (IN)

(73) Assignee: General Electric Company, Schenectady, NY (US)

( * ) Notice: Subject to any disclaimer, the term of this patent is extended or adjusted under 35 U.S.C. 154(b) by 171 days.

(21) Appl. No.: 16/229,533

(22) Filed: Dec. 21, 2018

(65) Prior Publication Data

US 2020/0200082 A1 Jun. 25, 2020

(51) Int. Cl.
| | | |
|---|---|---|
| *F02C 3/10* | (2006.01) | |
| *F02C 3/107* | (2006.01) | |
| *F02K 3/072* | (2006.01) | |
| *F02C 3/067* | (2006.01) | |

(52) U.S. Cl.
CPC .............. *F02C 3/107* (2013.01); *F02C 3/067* (2013.01); *F02K 3/072* (2013.01); *F05D 2260/40311* (2013.01)

(58) Field of Classification Search
CPC .. F02C 3/06; F02C 3/067; F02C 3/107; F02C 7/32; F02C 7/36; F02K 3/072; F05D 2260/40311
See application file for complete search history.

(56) References Cited

U.S. PATENT DOCUMENTS

| | | | |
|---|---|---|---|
| 4,251,987 A | 2/1981 | Adamson | |
| 4,969,325 A | 11/1990 | Adamson et al. | |
| 5,010,729 A * | 4/1991 | Adamson ................ | F02C 3/067 |
| | | | 416/129 |
| 6,183,388 B1 | 2/2001 | Hawkins | |
| 6,381,948 B1 | 5/2002 | Klingels | |
| 6,763,652 B2 | 7/2004 | Baughman et al. | |
| 6,895,741 B2 | 5/2005 | Rago et al. | |
| 7,451,592 B2 | 11/2008 | Taylor et al. | |
| 7,832,193 B2 | 11/2010 | Orlando et al. | |
| 7,882,691 B2 | 2/2011 | Lemmers, Jr. et al. | |
| 7,950,220 B2 | 5/2011 | Merry et al. | |
| 8,015,798 B2 | 9/2011 | Norris et al. | |
| 8,015,900 B2 | 9/2011 | Gmirya | |
| 8,191,352 B2 | 6/2012 | Schilling | |
| 8,333,678 B2 | 12/2012 | McCune | |
| 8,561,383 B2 | 10/2013 | Suciu et al. | |
| 8,667,777 B2 * | 3/2014 | Gallet .................... | F02C 3/067 |
| | | | 60/268 |
| 9,249,862 B2 | 2/2016 | Oh | |
| 2018/0003112 A1 | 1/2018 | Kupratis et al. | |
| 2018/0230902 A1* | 8/2018 | Desjardins ............. | F02C 6/206 |

\* cited by examiner

*Primary Examiner* — Woody A Lee, Jr.
*Assistant Examiner* — Maxime M Adjagbe
(74) *Attorney, Agent, or Firm* — Dority & Manning, P.A.

(57) ABSTRACT

A gear assembly for a turbo machine is provided. The gear assembly includes a first input shaft, a second input shaft, an output shaft, a fixed member, and a spindle. The spindle is extended along a spindle centerline axis. The first input shaft is drivingly connected to the spindle at a first interface. The second input shaft is drivingly connected to the spindle at a second interface. The spindle is connected to the fixed member providing a reactive force at a third interface. The spindle is connected to the output shaft at a fourth interface.

21 Claims, 4 Drawing Sheets

GEAR ASSEMBLY FOR A TURBO MACHINE

FIELD

The present subject matter relates to counter-rotating gear assemblies for turbo machines.

BACKGROUND

Indirect drive turbine engines include gear assemblies between the fan or propeller and the turbine such as to enable each of the fan and the turbine to rotate at different, higher efficiency speeds relative to one another. However, inefficiencies in gear assemblies may obviate fan and turbine speed efficiency improvements, such as via mechanical and thermal losses at the plurality of gears of the gear assembly. As such, there is a need for an improved efficiency gear assembly for a turbine engine.

BRIEF DESCRIPTION

Aspects and advantages of the invention will be set forth in part in the following description, or may be obvious from the description, or may be learned through practice of the invention.

An aspect of the present disclosure is directed to a gear assembly for a turbo machine. The gear assembly includes a first input shaft, a second input shaft, an output shaft, a fixed member, and a spindle. The spindle is extended along a spindle centerline axis. The first input shaft is drivingly connected to the spindle at a first interface. The second input shaft is drivingly connected to the spindle at a second interface. The spindle is connected to the fixed member providing a reactive force at a third interface. The spindle is connected to the output shaft at a fourth interface.

In one embodiment, the first interface defines a gear mesh defining a sun gear.

In another embodiment, the second interface defines a gear mesh defining a ring gear.

In yet another embodiment, the third interface defines a gear mesh defining a sun gear.

In one embodiment, the fourth interface defines a bearing assembly supporting the spindle to the output shaft.

In still another embodiment, the spindle is extended through a radially extended member of the output shaft and coupled thereto at the fourth interface.

In various embodiments, the spindle includes a first spindle axially separated from a second spindle. In one embodiment, the first spindle is drivingly connected to the first input shaft at the first interface. The first spindle and the second spindle are each drivingly connected to the second input shaft via respective second interfaces. In another embodiment, the first spindle is positioned at a first end of a radially extended member of the output shaft and the second spindle is positioned at a second end of the radially extended member opposite of the first end. The first end and the second end are each separated along an axial direction. In still another embodiment, each of the first spindle and the second spindle are drivingly connected to the output shaft at the fourth interface. The fourth interface defines a bearing assembly.

In one embodiment, the first spindle and the second spindle are each independently rotatable via separate bearing assemblies at each respective fourth interface between the first spindle and the second spindle relative to the output shaft.

In another embodiment, the second spindle is connected to the fixed member at the third interface. The third interface defines a gear mesh defining a sun gear.

In various embodiments, the first spindle is drivingly connected to the second input shaft at the second interface. The first spindle and the second spindle are each drivingly connected to the first input shaft via respective first interfaces. In one embodiment, the first spindle is positioned at a first end of the fixed member and the second spindle is positioned at a second end of the fixed member opposite of the first end. The first end and the second end are each separated along an axial direction. In another embodiment, the first spindle and the second spindle are each connected to the fixed member at the third interface. The second spindle is drivingly connected to the output shaft via the fourth interface. In still another embodiment, the fourth interface defines a ring gear interface.

In one embodiment, the first input shaft is configured to rotate relative to the axial centerline axis in a first direction, and wherein the second input shaft is configured to rotate relative to the axial centerline axis in a second direction opposite of the first direction.

Another aspect of the present disclosure is directed to a turbo machine including a fan assembly, a first low pressure turbine rotor configured to rotate in a first direction, a second low pressure turbine rotor configured to rotate in a second direction opposite of the first direction, and the gear assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
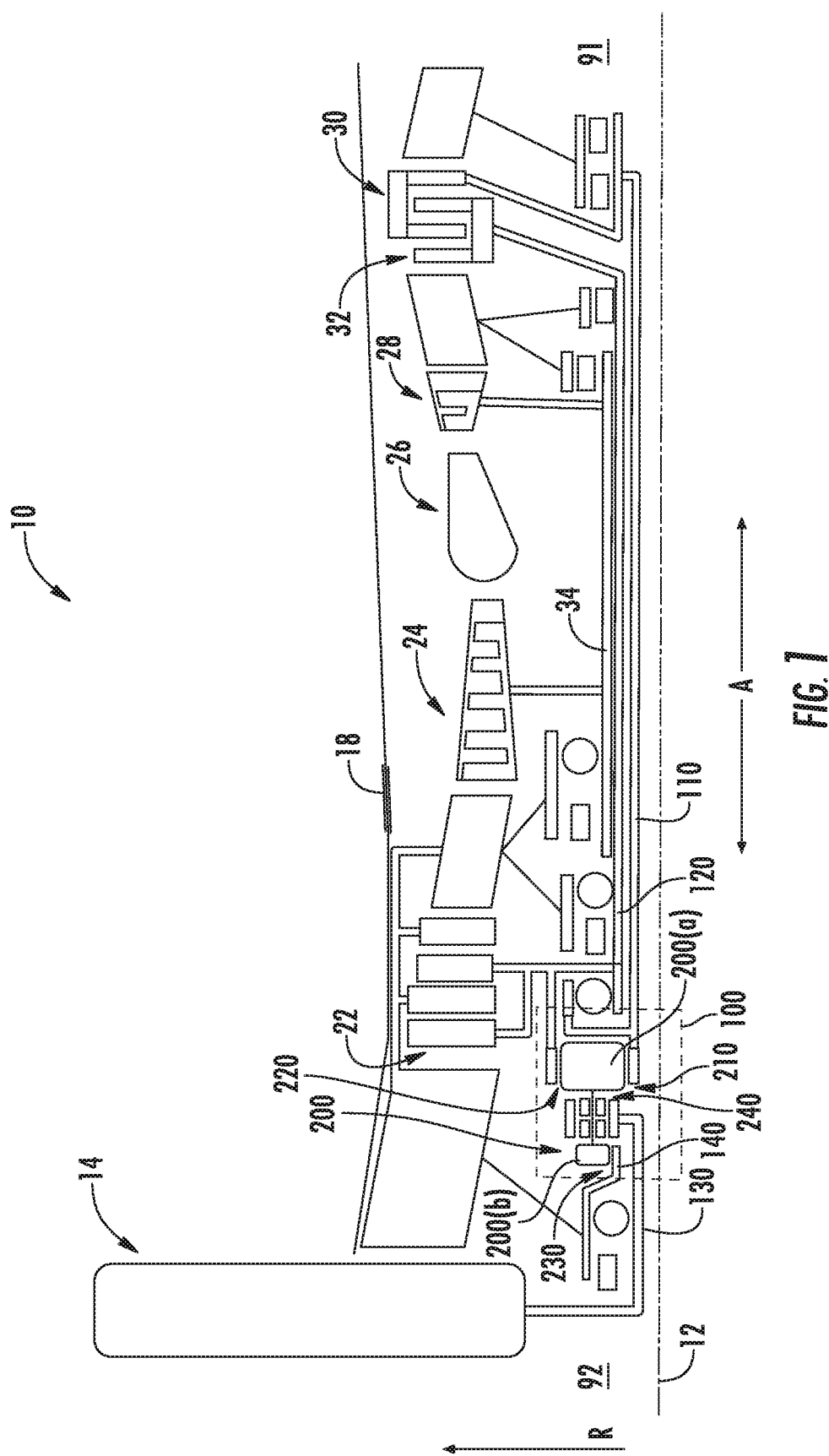
FIG. 1 is an exemplary schematic layout embodiment of a turbo machine including a gear assembly according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Referring now to the drawings, FIG. 1 is a schematic view of a turbo machine 10 (hereinafter, "engine 10") including embodiments of a gear assembly 100 according to aspects of the present disclosure. Embodiments of the gear assembly 100 herein provide an improved gear assembly for a counter-rotating turbine engine such as schematically depicted in FIG. 1. The gear assembly 100 provides improved efficiency, decreased power and torque transfer losses, and improved durability by obviating a need for idler planet gears to provide counter-rotation of dual input shafts, such as shown at a first input shaft 110 and a second input shaft 120.

The engine 10 includes, in serial flow order along an axial direction A, a fan assembly 14, a low pressure (LP) compressor 22, a high pressure (HP) 24 compressor, a combustion section 26, and a HP turbine 28. The engine 10 further includes a first LP turbine 30 and a second LP turbine 32. In various embodiments, such as schematically depicted, the first LP turbine 30 and the second LP turbine 32 are interdigitated with one another such that rotatable stages of the first LP turbine 30 alternate with rotatable stages of the second LP turbine 32 along the axial direction A. An outer casing 18 may substantially cover the compressors 22, 24, the combustion section 26, and the turbines 28, 30, 32 such as to define a core flowpath therewithin. A fixed member 140, such as a casing, frame, fixed shaft, or other support, may be fixedly connected to the outer casing 18. A reference axial centerline axis 12 is disposed through the engine 10 along the axial direction A, around which the compressors 22, 24, the shafts, 110, 120, 130, and the turbines 28, 30, 32 rotate.

The first input shaft 110 is connected to the first LP turbine 30 such as to transmit power and torque from the first LP turbine 30 rotor. The second input shaft 120 is drivingly connected to the second LP turbine 32 such as to transmit power and torque from the second LP turbine 32 rotor. Each of the input shafts 110, 120 is connected to the gear assembly 100 such as to each provide input power and torque to an output shaft 130 connected to the fan assembly 14. The gear assembly 100 may generally define a reduction gear assembly such as to receive input power from the first input shaft 110 rotating at a first speed and to further receive input power from the second input shaft 120 rotating at a second speed different from the first speed. The gear assembly 100 then outputs rotation to the output shaft 130 at a third speed different from the first speed of the first input shaft 110 and the second speed of the second input shaft 120.

Additionally, such as further described herein, the first LP turbine 30 and the second LP turbine 32 are each in counter-rotating arrangement, such that the first LP turbine 30, and the first input shaft 110 coupled thereto, rotates in a first direction opposite of the second LP turbine 32, and the second input shaft 120 coupled thereto, rotating in a second direction. It should be appreciated that the counter-rotating arrangement of the turbines 30, 32 provides an improved efficiency of the engine 10 via desirable velocity relationships of air flowing through each respective turbine 30, 32.

Figure 2:
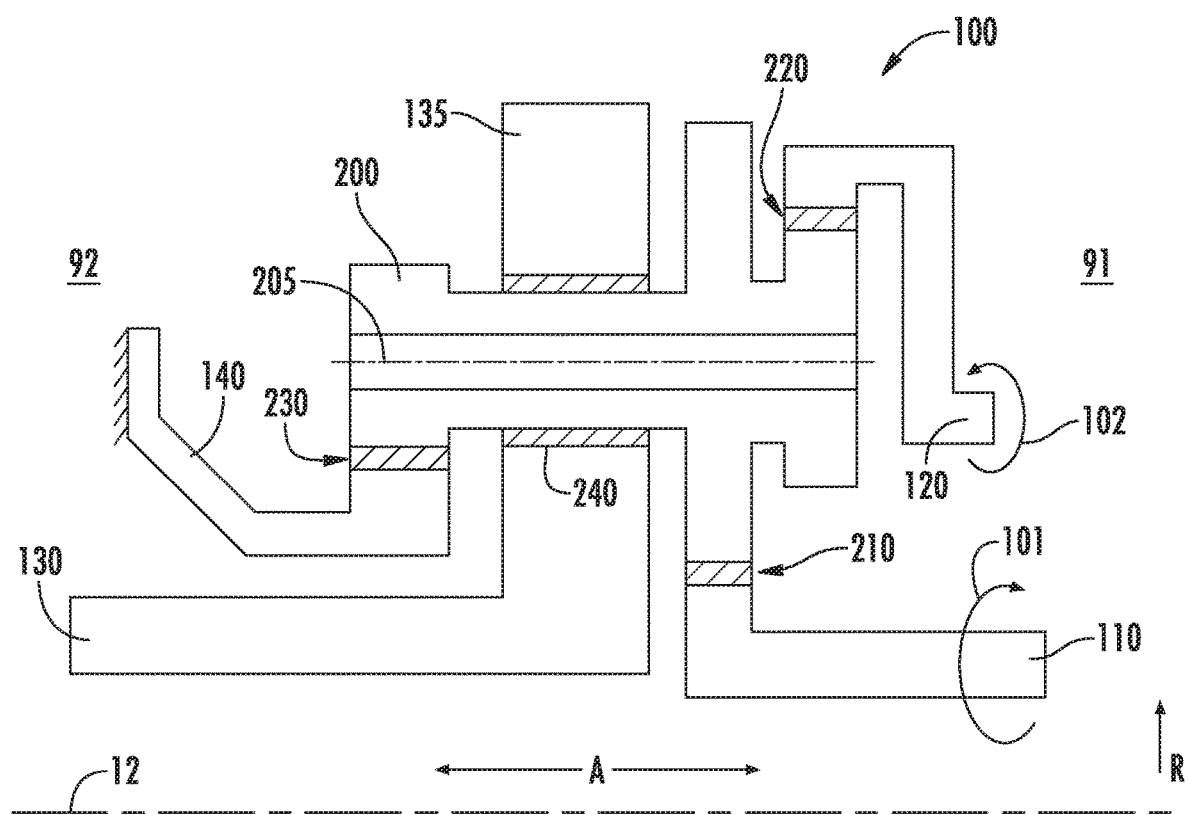
FIG. 2 is an exemplary schematic layout embodiment of the gear assembly of FIG. 1.

Referring to FIG. 2, an exemplary embodiment of the gear assembly 100 is provided. The first input shaft 110 and the second input shaft 120 are each drivingly connected to a spindle 200. The gear assembly 100 includes a plurality of spindles 200 each in circumferential arrangement relative to one another. The first input shaft 110 is drivingly connected to the spindle 200 at a first interface 210 such as to receive a first input torque from the first LP turbine 30. The first interface 210 is disposed radially inward relative to a spindle centerline axis 205 around which the spindle 200 rotates. Additionally, the spindle 200 rotates around the axial centerline axis 12 of the engine 10.

The second input shaft 120 is drivingly connected to the spindle 200 at a second interface 220 such as to receive a second input torque from the second LP turbine 32. The second interface 220 is disposed radially outward relative to the spindle centerline axis 205 around which the spindle 200 rotates.

The spindle 200 reacts against the fixed member 140 at the third interface 230 such as to enable the spindle 200 to travel around the axial centerline axis 12 and rotate around the spindle centerline axis 205. In various embodiments, the fixed member 140 includes a frame, fixed shaft, casing, or other stationary member of the engine 10.

The output shaft 130 is attached to the spindle 200 at a fourth interface 240 such as to receive power and torque from the first input shaft 110 and the second input shaft 120 via the spindle 200 to rotate the output shaft 130 around the axial centerline axis 12. In one embodiment, such as depicted in FIG. 2, the spindle 200 is extended through a radially extended member 135 of the output shaft 130 and coupled to the fourth interface 240 therewithin. In various embodiments, the fourth interface 240 is a bearing assembly, such as, but not limited to, a rolling bearing element assembly. In still various embodiments, the rolling bearing element assembly may include thrust bearings, roller bearings, tapered roller bearings, etc.

In various embodiments, the first input shaft 110 rotates in a first direction 101 relative to the axial centerline axis 12 and the second input shaft 120 rotates in a second direction 102 opposite of the first direction 101. The spindle 200 is operatively connected to the output shaft 130 such as to enable torque to transfer from each spindle 200. Each spindle 200 rotates relative to each spindle centerline axis 205. Additionally, each spindle 200 travels circumferentially around the axial centerline axis 12 of the engine 10 (i.e., each spindle centerline axis 205 travels circumferentially around the axial centerline axis 12 as each spindle 200 rotates around the spindle centerline axis 205). The spindle 200 is operatively coupled to the output shaft 130 to transmit torque to the output shaft 130 such as to rotate the output shaft 130 around the axial centerline axis 12.

In various embodiments, the spindle 200 acts as a carrier gear to transmit power and torque from each of the first input shaft 110 and the second input shaft 120 to the output shaft 130. In the embodiments depicted, each interface 210, 220, 230 at which the first input shaft 110, the second input shaft 120, and the fixed member 140 are each respectively coupled to the spindle 200 defines a gear mesh, such as a spline interface, at which each shaft 110, 120 and the fixed member 140 is connected directly to the spindle 200. The direct connection of each input shaft 110, 120 and the fixed member 140 to the spindle 200 removes the need for an idler gear mesh or planet gear to reverse the direction of the input shafts 110, 120. As such, the gear assembly 100 enables a more compact, simpler, and more durable gear assembly that further enables improved efficiency of the engine via a counter-rotating turbine section including the first LP turbine 30 in counter-rotating arrangement relative to the second LP turbine 32 (i.e., the first LP turbine 30 and the first input shaft 110 each rotate along the first direction 101 and the second LP turbine 32 and the second input shaft 120 each rotate along the second direction 102 opposite of the first direction 101).

In various embodiments, the first interface 210 at which the first input shaft 110 is connected to the spindle 200 defines a sun gear interface. The second interface 220 at which the second input shaft 120 is connected to the spindle 200 defines a ring gear interface. In various embodiments, the spindle 200 may include two or more second interfaces 220 at which the second input shaft 220 is drivingly connected to the spindle 200, such as depicted in regard to FIG. 3 and further described below. In still yet various embodiments, the spindle 200 may include two or more first interfaces 210 at which the first input shaft 110 is drivingly connected to the spindle 200, such as depicted in regard to FIG. 4 and further described below.

Figure 3:
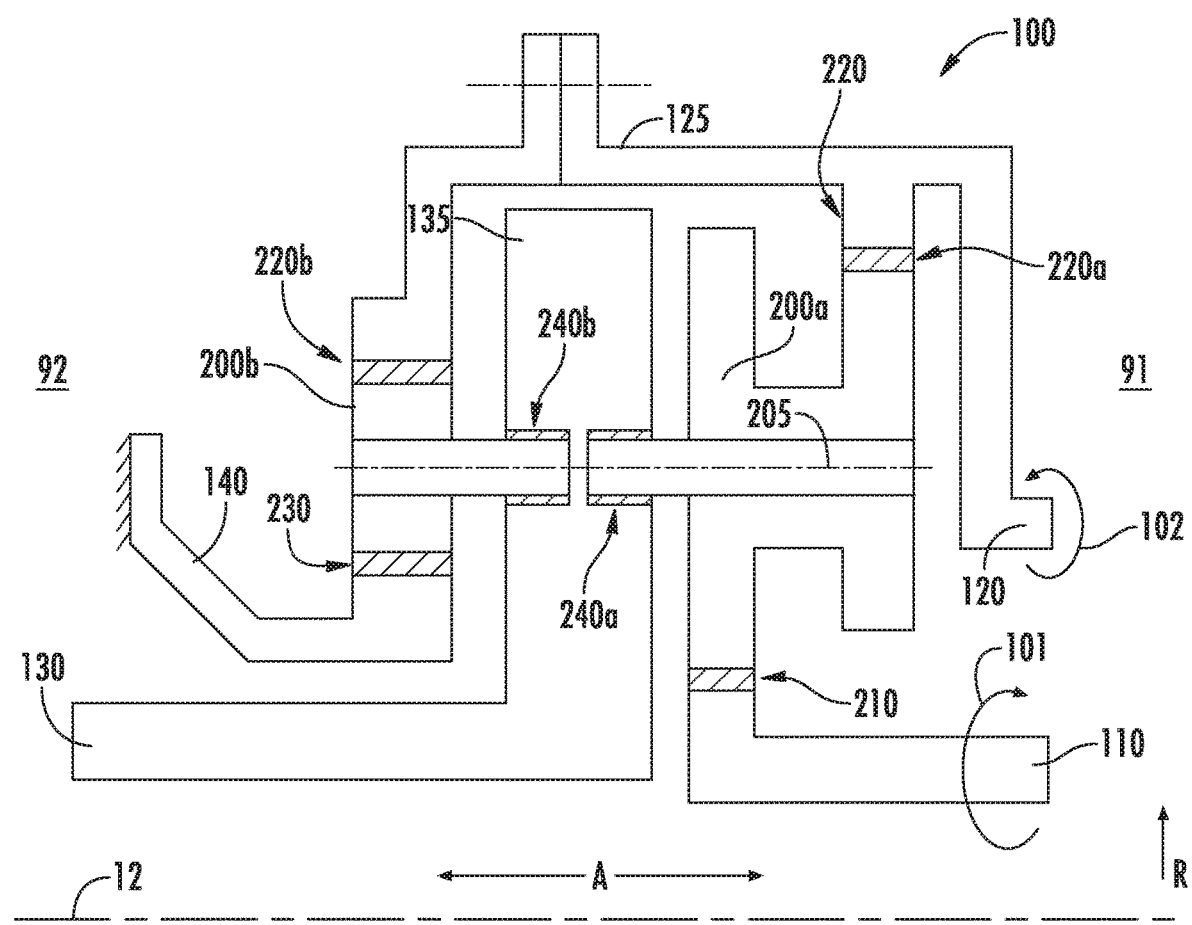
FIG. 3 is another exemplary schematic layout embodiment of the gear assembly of FIG. 1.

Referring now to FIG. 3, another exemplary embodiment of the gear assembly 100 is provided. The gear assembly 100 is configured substantially similarly as shown and described in regard to FIG. 2. In FIG. 3, the spindle 200 is split into a pair of spindles 200(a), 200(b) in axial arrangement (i.e., adjacent to each other relative to the axial centerline axis 12). Each spindle 200(a), 200(b) includes the second interface respective to each spindle, such as depicted at each of the second interface 220(a) relative to a first spindle 200(a) and the second interface 220(b) relative to a second spindle 200(b).

In various embodiments, the first spindle 200(a) is axially separated from the second spindle 200(b) via the output shaft 130. More particularly, in one embodiment, the output shaft 130 includes a radially extended member 135 (i.e., extended outward relative to the axial centerline axis 12). The first spindle 200(a) is connected to the output shaft 130 at the radially extended member 135 at a first end 91 and the second spindle 200(b) is connected to the radially extended member 135 at a second end 92 axially opposite of the first end 91. The first end 91 may generally correspond to the side more proximate to the turbines 30, 32 than the second end 92. The second end 92 may generally correspond to the side more proximate to the fan assembly 14 than the first end 91.

In still various embodiments, the second input shaft 120 includes a portion 125 radially surrounding the radially extended member 135 and the first spindle 200(a). The portion 125 is extended along the axial direction A to connect the second spindle 200(b) at the second interface 220(b).

In the embodiment depicted in regard to FIG. 3, each of the spindles 200(a), 200(b) is drivingly connected to the output shaft 130. The first spindle 200(a) is drivingly connected to the first input shaft 110 via the first interface 210, such as described in regard to FIG. 2. The first spindle 200(a) is further drivingly connected to the second input shaft 120 via the second interface 220(a), such as described in regard to FIG. 2. The first spindle 200(a) is connected to the output shaft 130 (e.g., connected to the radially extended portion 135 of the output shaft 130) at the fourth interface 240(a). The first spindle 220(a) receives input torque in the first direction 101 from the first input shaft 110 at the first interface 210 and further receives input torque in the second direction 102 from the second input shaft 120 at the second interface 220(a). The first spindle 220(a) is able to rotate relative to the spindle centerline axis 205 and travel around the axial centerline axis 12 such as described in regard to FIG. 2.

The second input shaft 120 is further connected to the second spindle 200(b) at the second interface 220(b). The second spindle 200(b) further includes the third interface 230 at which the second spindle 220(b) is connected to the fixed member 140. The output shaft 130 is further connected to the second spindle 220(b) at the fourth interface 240(b). The fixed member 140 connected to the second spindle 220(b) connected via the third interface 230 provides a reactive force enabling rotation of the output shaft 130 relative to the axial centerline axis 12. The second spindle 220(b) is further enabled to rotate relative to the spindle centerline axis 205 and travel circumferentially around the axial centerline axis 12.

Figure 4:
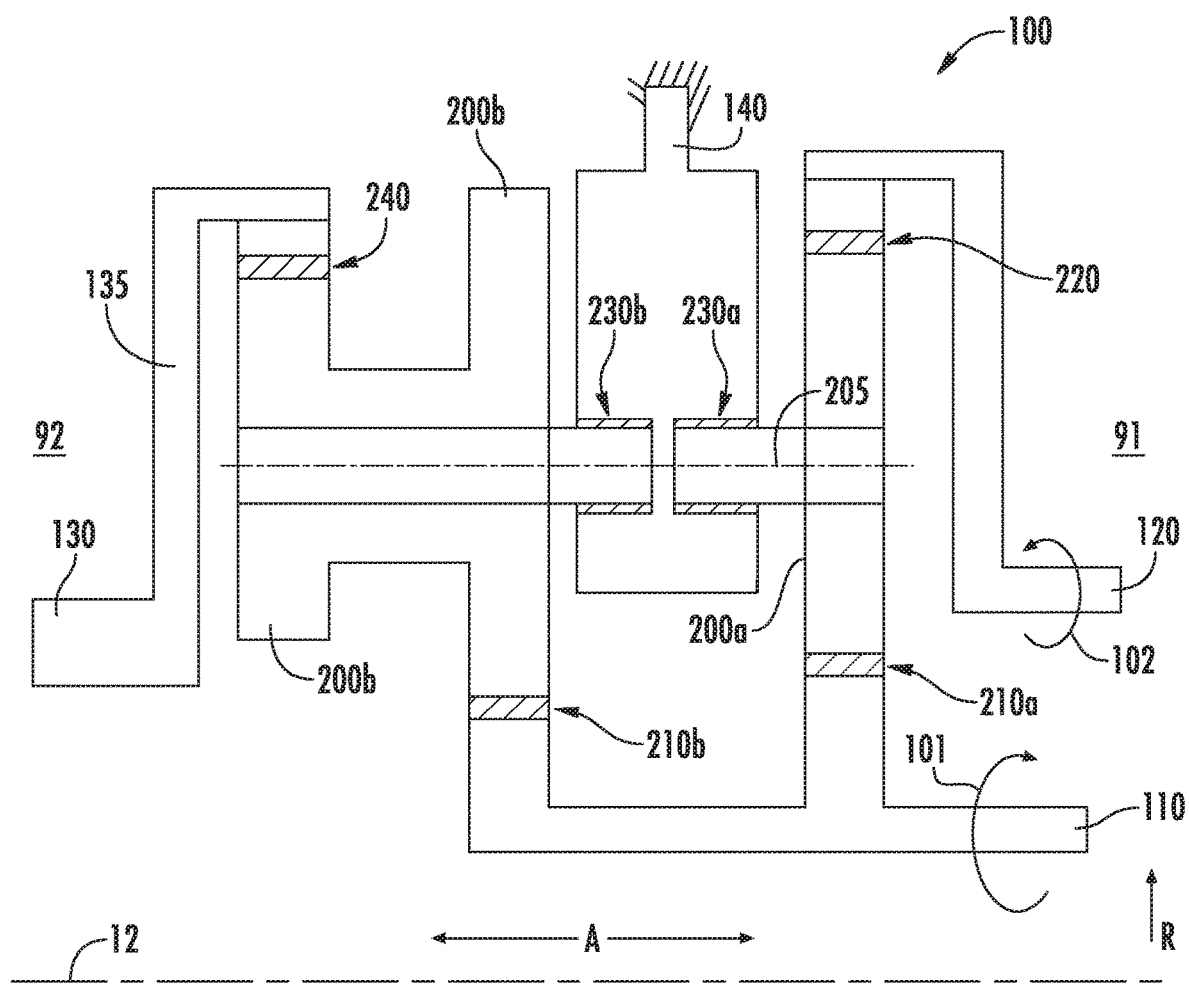
FIG. 4 is yet another exemplary schematic layout embodiment of the gear assembly of FIG. 1.

Referring now to FIG. 4, another exemplary embodiment of the gear assembly 100 is provided. The gear assembly 100 is configured substantially similarly as shown and described in regard to FIG. 2. In FIG. 4, the spindle 200 is split into a pair of spindles 200(a), 200(b) in adjacent arrangement along the axial direction A. Each spindle 200(a), 200(b) includes the first interface respective to each spindle, such as depicted at each of the first interface 210(a) relative to the first spindle 200(a) and the first interface 210(b) relative to the second spindle 200(b).

Referring to FIG. 4, the first spindle 200(a) is connected to the fixed member 140 at the first end 91 via the third interface 230(a) relative to the first spindle 200(a). The second spindle 200(b) is connected to the fixed member 140 at the second end 92 axially opposite of the first end 91 via the third interface 230(b) relative to the second spindle 200(b). The first spindle 200(a) and the second spindle 200(b) are each supported at the radially extended fixed shaft 140 through each interface 230(a), 230(b). In various embodiments, each portion of the third interface 230(a), 230(b) defines a separate bearing assembly from one another. For example, each third interface 230(a), 230(b) defines a separately supported or separately rotatable connection of the fixed shaft 140 to each of the first spindle 230(a) and the second spindle 230(b). Each of the first spindle 200(a) and the second spindle 200(b) is separated along the axial direction A by the fixed member 140 therebetween.

The first spindle 200(a) is drivingly connected to each of the first input shaft 110 and the second input shaft 120 such as described in regard to FIGS. 2-3. In FIG. 4, the first spindle 200(a) reacts against the fixed member 140 at the third interface 230(a) such as to enable power and torque to transfer through the first spindle 200(a) from the second input shaft 120 to the first input shaft 110 via the first interface 210(a) at the first spindle 200(a). Power and torque is further transferred from the first input shaft 110 to the second spindle 200(b) at the first interface 210(b). The second spindle 200(b) reacts against the fixed member 140 at the third interface 230(b) such as described in regard to FIGS. 2-3. Power and torque is further transferred to the output shaft 130 from the second spindle 200(b) via the fourth interface 240.

The embodiment shown and described in regard to FIG. 2 depicts a three gear mesh arrangement in which power and torque are transferred from each of the first input shaft 110 and the second input shaft 120 to the spindle 200 via the respective first interface 210 and the second interface 220. Power and torque are further transferred from the spindle 200 to the output shaft 130 via the fourth interface 240. In various embodiments, each of the first interface 210, the second interface 220, and the third interface 230 defines a gear mesh with each respective first input shaft 110, second input shaft 120, and fixed member 140. In still various embodiments, the fourth interface 240 includes a bearing assembly, such as a rolling bearing element.

The embodiment shown and described in regard to FIG. 3 depicts a four gear mesh arrangement in which power and torque are transferred from the second input shaft 120 via a pair of ring gears at the spindles 200(a), 200(b), such as depicted via each second interface 220(a), 220(b) in FIG. 3. Power and torque are further transferred from the first input shaft 110 via a sun gear at the first spindle 200(a), such as depicted via the first interface 210 in FIG. 3. The fixed member 140 is further connected to the second spindle 220(b) connected via the third interface 230 defining a sun gear. The output shaft 130 receives power and torque via the fourth interface 240(a), 240(b) at each spindle 200(a), 200(b) in which each fourth interface 240(a), 240(b) defines a separately loaded or separately rotatable bearing assembly.

The embodiment shown and described in regard to FIG. 4 depicts a four gear mesh arrangement in which power and torque are transferred from the first input shaft 110 via a pair of sun gears at the spindles 200(a), 200(b), such as depicted via each first interface 210(a), 210(b) in FIG. 4. Power and torque are further transferred from the second input shaft 120 via a ring gear at the first spindle 200(a), such as depicted via the second interface 220 in FIG. 4. The output shaft 130 receives power and torque via a ring gear at the fourth interface 240 at the second spindle 200(b).

In various embodiments, the third interfaces 230(a), 230(b) may be radially and/or circumferentially aligned relative to one another. In other embodiments, the fourth interfaces 240(a), 240(b) may be radially and/or circumferentially aligned to one another. In still various embodiments, the third interfaces 230(a), 230(b) may be radially and/or circumferentially separated relative to one another. In still other embodiments, the fourth interfaces 240(a), 240(b) may be radially and/or circumferentially separated relative to one another.

In still various embodiments, the respective circumferential arrangement of the first spindles 200(a) or the second spindles 200(b) may be defined independently rotatable around the axial centerline axis 12. The plurality of circumferentially arranged first spindles 200(a) may include a first quantity of spindles 200(a) different from a second quantity of the plurality of circumferentially arranged second spindles 200(b). The different first quantity and second quantity of spindles 200(a), 200(b) may enable load transfer to the output shaft 130 while further enabling different rotational speeds of each respective input shaft 110, 120.

Embodiments of the gear assembly 100 provided herein may be manufactured via one or more processes known in the art, such as, but not limited to, forging, casting, and machining processes, additive manufacturing or 3D printing processes, or other material additive or material removal processes. The gear assembly 100 is further manufactured via one or more materials suitable for gear assemblies generally, or more particularly, gear assemblies for turbo machines, including turbofan, turboprop, turbojet, turboshaft, prop fan, or other turbo machine configurations of the engine 10 schematically provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gear assembly for a turbo machine, wherein the gear assembly defines an axial centerline axis therethrough, the gear assembly comprising:
    a first input shaft;
    a second input shaft;
    an output shaft;
    a fixed member; and
    a spindle extended along a spindle centerline axis, wherein the first input shaft is drivingly connected to the spindle at a first interface, wherein the second input shaft is drivingly connected to the spindle at a second interface, wherein the spindle is connected to the fixed member providing a reactive force at a third interface, wherein the spindle is connected to the output shaft at a fourth interface, and wherein the spindle extends at least partially through a radially extended member of the output shaft for connection to the output shaft at the fourth interface, the radially extended member extending outwardly from the output shaft along a radial direction and the radially extended member extending outwardly along a radial direction beyond the spindle.

2. The gear assembly of claim 1, wherein the first interface defines a gear mesh defining a sun gear.

3. The gear assembly of claim 1, wherein the second interface defines a gear mesh defining a ring gear.

4. The gear assembly of claim 1, wherein the third interface defines a gear mesh defining a sun gear.

5. The gear assembly of claim 1, wherein the fourth interface defines a bearing assembly supporting the spindle to the output shaft.

6. The gear assembly of claim 5, wherein the bearing assembly is a rolling bearing element assembly.

7. The gear assembly of claim 1, wherein the spindle comprises a first spindle axially separated from a second spindle, wherein the first spindle is axially separated from the second spindle within the radially extended member of the output shaft.

8. The gear assembly of claim 7, wherein the first spindle is drivingly connected to the first input shaft at the first interface, and further wherein the first spindle and the second spindle are each drivingly connected to the second input shaft via respective second interfaces.

9. The gear assembly of claim 8, wherein the first spindle is positioned at a first end of a radially extended member of the output shaft and the second spindle is positioned at a second end of the radially extended member opposite of the first end, wherein the first end and the second end are each separated along an axial direction.

10. The gear assembly of claim 9, wherein each of the first spindle and the second spindle are drivingly connected to the output shaft at the fourth interface, and wherein the fourth interface defines a bearing assembly.

11. The gear assembly of claim 7, wherein the first spindle and the second spindle are each independently rotatable via separate bearing assemblies at each respective fourth interface between the first spindle and the second spindle relative to the output shaft.

12. The gear assembly of claim 8, wherein the second spindle is connected to the fixed member at the third interface, wherein the third interface defines a gear mesh defining a sun gear.

13. A gear assembly for a turbo machine, wherein the gear assembly defines an axial centerline axis therethrough, the gear assembly comprising:
 a first input shaft;
 a second input shaft;
 an output shaft;
 a fixed member; and
 a spindle extended along a spindle centerline axis, wherein the first input shaft is drivingly connected to the spindle at a first interface, wherein the second input shaft is drivingly connected to the spindle at a second interface, wherein the spindle is connected to the fixed member providing a reactive force at a third interface, wherein the spindle is connected to the output shaft at a fourth interface, wherein the spindle extends at least partially through the fixed member for connection to the fixed member at the third interface, wherein the spindle comprises a first spindle axially separated from a second spindle, wherein the first spindle is axially separated from the second spindle within the fixed member at the third interface, wherein the first spindle is drivingly connected to the second input shaft at the second interface, and wherein the first spindle and the second spindle are each drivingly connected to the first input shaft via respective first interfaces.

14. The gear assembly of claim 13, wherein the first spindle is positioned at a first end of the fixed member and the second spindle is positioned at a second end of the fixed member opposite of the first end, wherein the first end and the second end are each separated along an axial direction.

15. The gear assembly of claim 14, wherein the first spindle and the second spindle are each connected to the fixed member at the third interface, and wherein the second spindle is drivingly connected to the output shaft via the fourth interface.

16. The gear assembly of claim 13, wherein the fourth interface defines a ring gear interface.

17. The gear assembly of claim 1, wherein the first input shaft is configured to rotate relative to the axial centerline axis in a first direction, and wherein the second input shaft is configured to rotate relative to the axial centerline axis in a second direction opposite of the first direction.

18. A turbo machine, the turbo machine defining an axial centerline axis extended along an axial direction, the turbo machine comprising:
 a fan assembly;
 a first low pressure turbine rotor configured to rotate in a first direction;
 a second low pressure turbine rotor configured to rotate in a second direction opposite of the first direction; and
 a gear assembly comprising;
  a first input shaft drivingly connected to the first low pressure turbine rotor;
  a second input shaft drivingly connected to the second low pressure turbine rotor;
  an output shaft drivingly connected to the fan assembly;
  a fixed member; and
  a spindle extended along a spindle centerline axis, wherein the first input shaft is drivingly connected to the spindle at a first interface, wherein the second input shaft is drivingly connected to the spindle at a second interface, wherein the spindle is connected to the fixed member providing a reactive force at a third interface, wherein the spindle is connected to the output shaft at a fourth interface, and wherein the spindle extends at least partially through a radially extended member of the output shaft for connection to the output shaft at the fourth interface, the radially extended member extending outwardly from the output shaft along a radial direction and the radially extended member extending outwardly along a radial direction beyond the spindle.

19. The turbo machine of claim 18, wherein the spindle comprises a first spindle axially separated from a second spindle, wherein the first spindle is axially separated from the second spindle within the radially extended member of the output shaft.

20. The turbo machine of claim 19, wherein the first spindle is drivingly connected to the first input shaft at the first interface, and further wherein the first spindle and the second spindle are each drivingly connected to the second input shaft via respective second interfaces.

21. The turbo machine of claim 19, wherein the first spindle is drivingly connected to the second input shaft at the second interface, and further wherein the first spindle and the second spindle are each drivingly connected to the first input shaft via respective first interfaces.

\* \* \* \* \*